United States Patent [19]

Peters

[11] 4,123,727
[45] Oct. 31, 1978

[54] ATOMIC STANDARD WITH REDUCED SIZE AND WEIGHT
[76] Inventor: Harry E. Peters, 1675 Northwood Lake, Northport, Ala. 35476
[21] Appl. No.: 871,088
[22] Filed: Jan. 19, 1978
[51] Int. Cl.² .............................................. H01S 1/06
[52] U.S. Cl. ................................................... 331/94
[58] Field of Search ........................ 331/3, 94; 324/0.5
[56] References Cited
U.S. PATENT DOCUMENTS
3,462,705  8/1969  Vessot .................................... 331/94
3,924,200  12/1975  Peters .................................... 331/94

Primary Examiner—John Kominski
Attorney, Agent, or Firm—Isaac P. Espy

[57] ABSTRACT

An improvement in an atomic or molecular frequency standard, more particularly, the atomic hydrogen maser, by the use of electrode structures circumferentially placed around the exterior of the atomic or molecular storage vessel and in a surface of revolution about the initial atomic hydrogen beam path. These electrodes allow maser action in maser devices of physical dimensions much smaller than those formerly possible.

6 Claims, 3 Drawing Figures

ATOMIC STANDARD WITH REDUCED SIZE AND WEIGHT

BACKGROUND OF THE INVENTION

This invention relates generally to atomic or molecular frequency standards and more particularly to improvements in an atomic hydrogen maser.

Atomic or molecular devices, for example the hydrogen maser, the cesium beam standard, the rubidium cell resonance standard, and the rubidium maser have very precise and stable frequencies of operation which are accurately related to quantum transitions in atoms or molecules. The stability and precision of these devices depends upon the interaction of the atom or molecule with oscillatory electromagnetic fields which are produced within a microwave cavity resonator wherein the atom or molecule is present while undergoing those quantum transitions. The oscillatory electromagnetic field in the microwave cavity has essentially the same frequency and wavelength as the atomic or molecular transition radiation, and the physical size of said microwave cavity in each type of device (in the present state of the art) is directly related to the wavelength of the radiation. In an apparatus such as the atomic hydrogen maser, wherein the hydrogen transition wavelength is nominally 8.3 inches (21.1 Cm), the resultant cavity is typically cylindrical having a 10 inch (25.4 Cm) diameter and being 20 inches (50.8 Cm) in length. The cavity is invariably made of massive, stable material, such as fused silica, copper, or aluminum, and is enclosed within a large high vacuum envelope, additionally surrounded by large, multi-layer, magnetic shields and thermostat structures. The net result is that all past state-of-the-art hydrogen masers are very large, typically between 4 and 6 feet high and 2 feet deep by 2 feet wide; the entire devices have been very heavy, weighing typically between 400 and 800 pounds.

The atomic hydrogen maser is well known to provide one of the best, most stable and accurate, frequency standards presently known; however, the large size, weight, and consequent cost have been universally recognized as the predominant disadvantage in its use.

Ramsey (U.S. Pat. No. 3,255,423) disclosed an atomic hydrogen maser, and the illustration thereof indicates the elongated nature of state-of-the-art devices. A. O. McCoubrey, in his article "A Survey of Atomic Frequency Standards," *Proceedings of the IEEE*, February 1966, pages 124, 133, referred to size, weight and cost as the principal limitations to usefulness of the hydrogen maser. Peters (U.S. Pat. No. 3,924,200) invented a storage bulb which allowed accurate measurement of "wall shift" but did not disclose any matters anticipating the present invention.

SUMMARY OF THE INVENTION

It is the primary object of the present invention to provide an improved atomic or molecular frequency standard.

Another object is to provide a new and improved microwave cavity design for use in such a standard which is up to a factor of two or more smaller in dimensions than is used in present state-of-the-art devices.

Another object, consequent on the foregoing, is to provide an atomic or molecular standard which is less in weight and volume by a nominal factor of eight or more from past state-of-the-art devices, the entire device thereby being capable of production at a substantially reduced cost.

These and other objects of the invention are achieved by providing within the maser electromagnetic cavity certain electrode structures which modify the historically typical electromagnetic field geometrical configuration in such a way that field intensities and orientations are maintained as necessary to produce optimal maser oscillation properties and stability characteristics, and concomitantly significantly reduce the physical linear dimensions of the maser cavity.

The reduction in cavity size allows there to be a proportionate reduction in size of associated parts, such as vacuum enclosure, magnetic shield structure, thermostats, and supporting structure, so that, for example, a reduction by a factor of two in cavity linear dimensions results in a nominal factor of up to eight or more reduction in volume and weight in the overall physical structure.

In summary, my invention consists in the placing of electrode structures circumferentially around the atomic storage bulb, and in a surface of revolution about the axis of the entering atomic hydrogen beam. These electrodes concentrate and orient the oscillating magnetic field, and enhance the filling factor parameter.

The invention herein described can be used in various types of configurations of atomic or molecular frequency standards. For example, present conceptions of such devices based upon the hydrogen atom use what is known as the passive resonance or the active oscillator principles, and may use different constructions or materials in design of the storage bulb used to contain the atoms within the microwave cavity. The active hydrogen maser embodiment of the invention set forth below is for illustrative purposes only; other embodiments and applications will be readily apparent to those familiar with the state of the art.

DETAILED DESCRIPTION OF THE INVENTION

Figure 1:
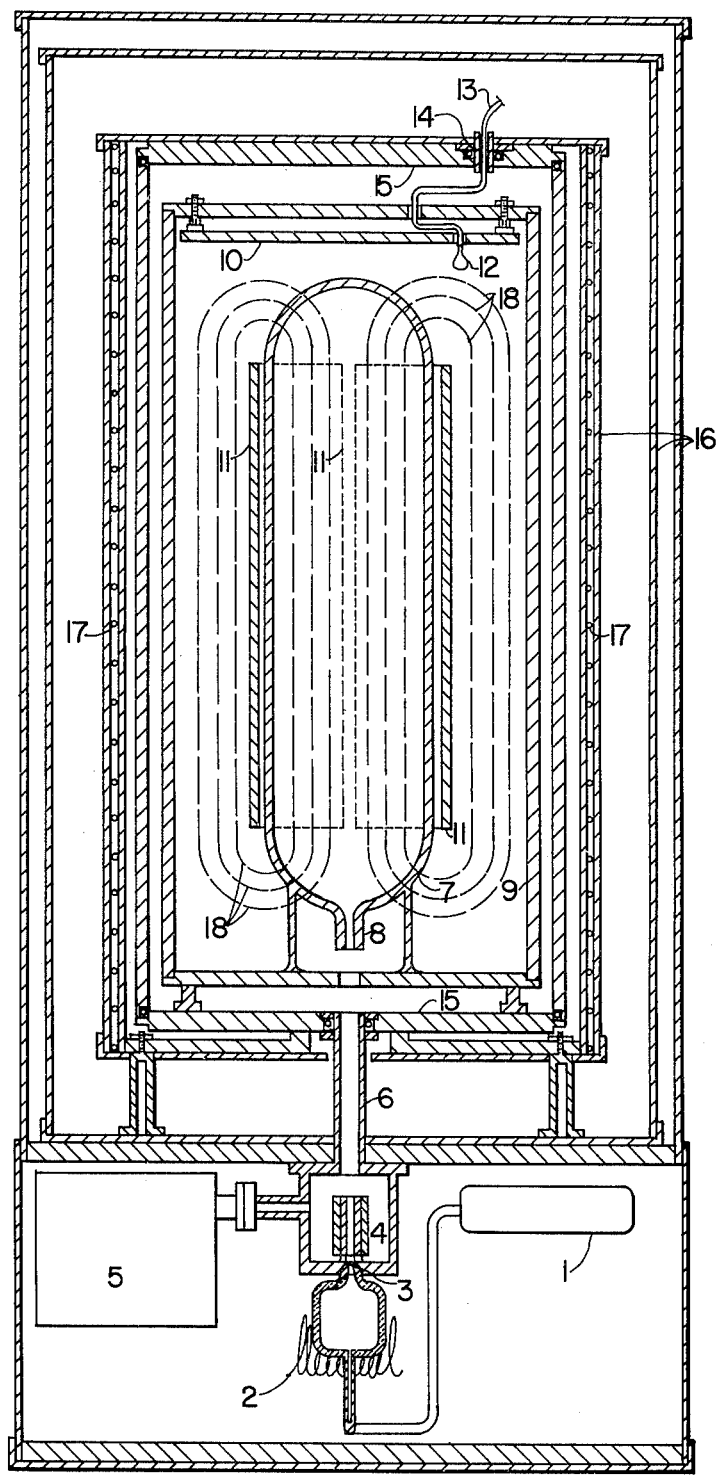
FIG. 1 is a cross-sectional view of a hydrogen maser device, taken along a vertical plane passed through the center of the device.

Referring now to FIG. 1, there is shown a vertical cross-sectional view of an atomic hydrogen maser device. Its operation as a frequency standard may be described by reference to its parts thereon shown. A hydrogen supply bottle 1 supplies molecular hydrogen through an R.F. source 2 which dissociates the diatomic molecules into a beam of atomic hydrogen. The atomic hydrogen is collimated into a beam by a source beam collimator 3. It then passes through a state selector 4 which defocusses those hydrogen atoms existing in lower quantum energy states. The defocussed atoms are then pumped away by a vacuum pump 5. Atoms in the higher energy quantum states, still in the beam, are focussed towards the central axis of the maser and pass through connecting tube 6 and into the maser storage bulb 7 via bulb collimator 8. The storage region bulb 7 as illustrated is typically made of fused quartz and is coated internally with a thin layer of material such as Teflon ®(FEP), such material having a very small effect upon the energy levels of atoms which impinge upon the walls of storage bulb 7. The atoms remain within bulb 7 for a time on the order of one second, after which they pass back out through collimator 8 and tube 6, and so are also pumped away by pump 5. Bulb 7 is within a microwave cavity 9 which is tuned to the frequency of the hydrogen atom quantum transition. Coarse tuning of the cavity is accomplished by adjustment of the position of tuning plate 10, while fine tuning is typically accomplished by using external electronic systems, such as by utilization of temperature control in conjunction with the inherent thermal expansion coefficient of the cavity material. Also within the cavity, the subject of the present invention, are one or more metal plates, or electrodes 11, generally circumferential about the bulb 7 and in a surface of revolution about the beam centerline, which confine the oscillating electromagnetic field of the cavity to a desirable orientation with respect to the magnetic moment of the hydrogen atoms, as well as enhance the intensity of said field in the region of storage bulb 7, so that optimum coupling occurs between said field and atoms stored within said bulb. Due to maser action, transitions occur between quantum states of said stored atoms with concurrent release of electromagnetic energy of unique frequency to the microwave cavity 9. Coupling loop 12 extracts a proportion of this electromagnetic energy wherein it passes via coaxial cable 13 and vacuum feed-through 14 through the wall of vacuum enclosure 15 and so to external electronics systems which produce the useful hydrogen maser standard output signals. Magnetic shields 16 reduce the ambient external field to a low level, and a small, uniform, axial magnetic field is produced by magnetic field coil 17. The internal processes take place in a vacuum provided by vacuum enclosure 15 and vacuum pump 5.

Within the cavity of the maser illustrated by FIG. 1 is an oscillating magnetic field shown by broken lines 18, as well as an oscillating electric field, orthogonal to said magnetic field, and not shown in this view. Said oscillating magnetic field is coaxial with the small D.C. magnetic field produced by the aforementioned coil 17. It is the axial component of said oscillating magnetic field with which the atom interacts in the maser action, and it is one of the important functions of electrodes 11 to concentrate said field within the volume of storage bulb 7, wherein hydrogen atoms are stored. One of the most important parameters which characterize opimum maser action, known as the "filling factor" is significantly enhanced by said concentration of the oscillating magnetic field. With electrodes 11 placed approximately as shown, uniform concentration of the oscillating magnetic field in the region of the storage bulb is much improved over the past state of the art wherein no such electrodes have been so employed. Another very important parameter is the quality factor, Q, of the microwave cavity, and if this factor is too low, active maser action will not occur, although passive resonance techniques, used in other embodiments, is still possible with low cavity Q. It is an advantage in many applications to have a reliably oscillating active principle maser, and calculations show that although cavity Q is reduced somewhat by use of said electrodes 11, the aforesaid "filling factor" improvement compensates sufficiently so that maser oscillation is not greatly degraded, or prevented.

Figure 2:
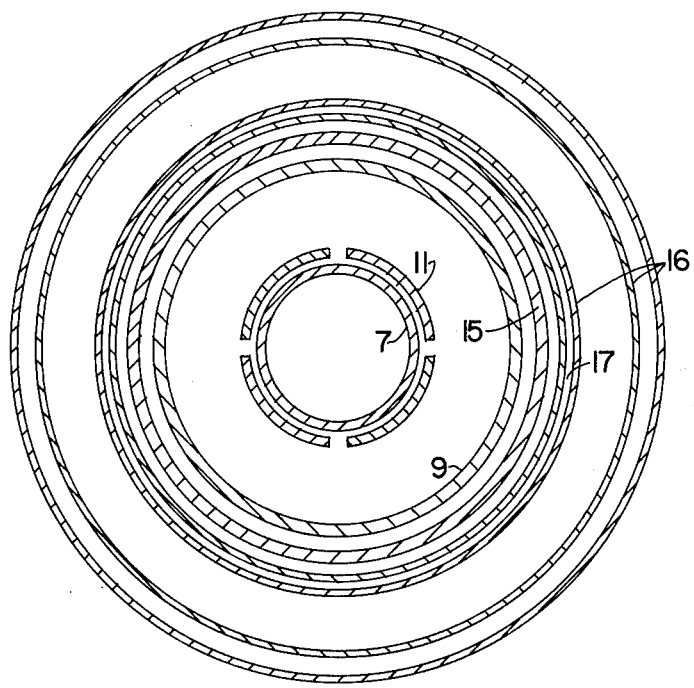
FIG. 2 is a cross-sectional plan view taken along a horizontal plane passed through the device at the height of the center of the microwave cavity. This view shows the embodiment of the invention wherein four electrode structures are used.

Referring now to FIG. 2, a plan view section taken as illustrated, the same embodiment of the invention as shown in FIG. 1 is shown wherein four metal electrodes 11 are placed in the proximity of, or attached to, the surface of storage bulb 7. In this view the oscillating magnetic field is perpendicular to the plan view surface and not shown, while the oscillating electric field is parallel to said view surface and generally circumferentially oriented about the central axis. Electric current flows circumferentially within the surface of electrodes 11 which thus characterize a certain inductance. Changing electric fields occur, primarily near the gaps in the electrodes, which thus characterizes a certain capacitance. As the gap dimensions are reduced, or the electrodes made to more completely surround the storage bulb 7 volume, the frequency of the cavity is lowered; or for a given frequency, the overall size of the cavity may be reduced. Calculations show that such electrodes may be thus employed to reduce the diameter and length of the maser microwave cavity 9 by up to a factor of two or more, while still maintaining adequate oscillation parameter values.

Figure 3:
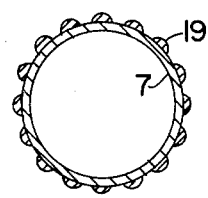
FIG. 3 is a cross-sectional plan of an alternate embodiment taken along a horizontal plane passed through the device at the height of the center of the microwave cavity wherein more than four electrodes are placed circumferentially around the storage bulb.

Referring now to FIG. 3, another plan view section is taken showing another embodiment of the same invention. Shown here is storage bulb 7 and a plurality of electrodes 19 which are attached to or placed in the vicinity of said storage bulb. This view is shown to illustrate that any number of such electrodes 19 from one electrode with one gap, to as many electrodes as desired, may be used to realize the size reduction advantages of the present invention. There may be a plurality of electrodes in the axial as well as the circumferential direction. Such electrodes should be made of a metal having high electrical conductivity, such as copper, silver, or aluminum; alternatively electrodes plated with such metals may be used. High electrical conductivity may also be achieved using other metals by operating the cavity at low temperatures wherein such alternative electrodes may become superconducting. The electrodes may be attached to the surface of the storage bulb by such techniques as vacuum metallization, fusing, or cementing or any other reliable means. Alternatively the electrodes may be attached to the cavity structure, as by insulating supports. Calculation shows that the optimum diameter of the storage bulb and associated electrodes is approximately one-half the cavity diameter; however, significant departure from this placement is feasible, particularly in a maser operating in the passive resonance mode.

Although particular embodiments of the invention have been described and illustrated herein, it is recognized that modifications, variations, and alternative embodiments may readily occur to those skilled in the art without departing from the spirit of the invention. Thus it is intended that all such modifications and equivalents to the particular embodiment are to be covered by the appended claims.

I claim:

1. An improved atomic or molecular frequency standard device utilizing the storage of atoms or molecules for periods of time within a defined storage region of space inside a microwave cavity, wherein the improvement comprises:

a. At least one electrode about and juxtapositioned to said storage region and within said microwave cavity;

b. Said electrodes so configured and placed to enhance, concentrate, and orient the oscillating magnetic field in the storage region;

c. Said electrodes being arrayed generally circumferentially around said storage region and in a surface of revolution about the axis of the atomic or molecular beam;

d. Said electrodes, storage region and microwave cavity so proportioned to be tuned for operation at approximately the atomic or molecular quantum transition frequency of the atoms or molecules used.

2. The invention of claim 1 wherein said electrodes comprise metal having high electrical conductivity, including silver, copper and aluminum.

3. The invention of claim 1 wherein the electrodes are attached to a quartz bulb storage region by reliable means, including vacuum metallization, metal paint or spray deposition, cementing, fusing, and mechanical attachment.

4. The invention of claim 1 wherein said electrodes comprise metals operated at low temperatures and exhibiting superconductivity.

5. The invention of claim 1 wherein said electrodes are plated with metals having high electrical conductivity, including those having inherent high electrical conductivity and those having high electrical conductivity induced by operating in a cryogenic environment.

6. The invention of claim 1 wherein said electrodes are physically supported from the microwave cavity through insulating supports.

* * * * *